(12) United States Patent
Whiteman et al.

(10) Patent No.: US 8,573,501 B2
(45) Date of Patent: Nov. 5, 2013

(54) RADIO FREQUENCY IDENTIFICATION MARKER HOUSING

(76) Inventors: Dylan Whiteman, West End (AU);
Pieter Adriaan Kuiper, Narangba (AU);
Alexander Cornelis Willem Kuiper, Jimboomba (AU)

( * ) Notice: Subject to any disclaimer, the term of this patent is extended or adjusted under 35 U.S.C. 154(b) by 0 days.

(21) Appl. No.: 13/498,129

(22) PCT Filed: Sep. 22, 2010

(86) PCT No.: PCT/AU2010/001246
§ 371 (c)(1),
(2), (4) Date: Mar. 23, 2012

(87) PCT Pub. No.: WO2011/035378
PCT Pub. Date: Mar. 31, 2011

(65) Prior Publication Data
US 2012/0175423 A1    Jul. 12, 2012

(30) Foreign Application Priority Data
Sep. 23, 2009   (AU) ............................ 2009904623

(51) Int. Cl.
*G06K 19/02*       (2006.01)
(52) U.S. Cl.
USPC ......................................... 235/488; 235/492
(58) Field of Classification Search
USPC ................... 235/488, 492; 340/572.1, 572.8
See application file for complete search history.

(56) References Cited

U.S. PATENT DOCUMENTS

| | | | |
|---|---|---|---|
| 7,605,708 B2* | 10/2009 | Cote et al. | 340/572.8 |
| 2002/0093104 A1* | 7/2002 | Goldmann et al. | 257/774 |
| 2008/0042851 A1* | 2/2008 | Baba et al. | 340/572.8 |
| 2009/0209849 A1* | 8/2009 | Rowe et al. | 600/424 |
| 2010/0102967 A1* | 4/2010 | Lee et al. | 340/572.8 |
| 2011/0121079 A1* | 5/2011 | Lawrence et al. | 235/488 |

FOREIGN PATENT DOCUMENTS

| | | |
|---|---|---|
| EP | 1152262 A1 | 11/2001 |
| WO | WO-2005100733 A1 | 10/2005 |
| WO | WO-2008122068 A1 | 10/2008 |
| WO | WO-2009025562 A1 | 2/2009 |

* cited by examiner

*Primary Examiner* — Ahshik Kim
(74) *Attorney, Agent, or Firm* — Birch, Stewart, Kolasch & Birch, LLP.

(57) ABSTRACT

A housing for a mine marker that houses RFID electronics. The RFID electronics is surrounded by a resiliently deformable tube that fits inside the housing, which may be an impact resistant plastic. The housing is filled with a first strengthening material and the tube may be filled with a second strengthening material. There is an impedance mismatch (a change in properties between adjacent layers so that shock waves are deflected) at the boundary between adjacent materials, (casing and first strengthening material, first strengthening material and tube, tube and second strengthening material, or casing and tube if they abut) which inhibits shock propagation.

21 Claims, 3 Drawing Sheets

RADIO FREQUENCY IDENTIFICATION MARKER HOUSING

BACKGROUND TO THE INVENTION

It is desirable in underground mining of ore to monitor the flow of ore through the mine. Effectively monitoring the flow of ore can assist in the calibration and validation of predictive ore flow models. Knowing the origin of the ore passing through the mine's haulage network also enables the grade of ore being delivered to the mill to be anticipated. This can help the mine operate more efficiently and improve recovery.

A known method of monitoring the flow of ore in cave mining (including block caving and sub-level caving) is to install mechanical markers in the ore body and retrieve the mechanical markers as they are transported through an ore pass or haulage tunnel, for instance by using electro-magnets near the crusher. The mechanical markers are installed in holes strategically drilled in the ore body and their positions recorded. One example of mechanical markers used in ore flow tracking is sections of steel pipe having individual welded identifiers. Markers may take from hours to years to pass through a mine and in the case of sub level caving markers may take up to 5 years before being excavated and in the case of block caving up to 10 years. Mechanical markers are not easily recoverable as recovery relies on the marker detection awareness of personnel and markers may be difficult to identify within the ore being transported. A lack of diligence on the part of miners can result in poor recovery rates. Also, steel markers give a poor data resolution, because they are recovered relatively late in the ore process, and are usually recovered daily (rather than in real time).

An alternative method which has been proposed for sub-level caving is to seed the muck piles resulting from blasting with radio frequency identification (RFID) markers. The RFID markers are then tracked by RFID readers placed along the haulage network. In order for this method to operate effectively a geologist must be at each blast site to seed the muck pile after blasting. As will be appreciated, the resolution of ore origin is not as fine when seeding the muck piles after blasting as when installing mechanical markers in the ore before blasting. It is also inconvenient, labour intensive and a health and safety risk to have a geologist seed the muck pile after every blast. The RFID markers can not be installed in the ore body before blasting as presently available RFIDs are not able to consistently withstand the shock of blasts in sub-level caving. Other challenges faced by the RFID markers are the length of time they have to remain active before detection and having to transmit their ID signal to the RFID readers through ore.

To operate in the harsh environment of an underground mine the RFID markers must meet rigorous mechanical and electronic standards. To date, the known mine markers fail on both counts. In particular, the known marker housings do not provide the necessary ruggedness to provide long life and reliability.

OBJECT OF THE INVENTION

It is an object of the invention to overcome or at least alleviate one or more of the above problems and/or provide the consumer with a useful or commercial choice.

It is a preferred object of the invention to provide a radio frequency identification marker housing which is capable of withstanding the conditions of underground mining.

SUMMARY OF THE INVENTION

In one form, although it need not be the only or indeed the broadest form, the invention resides in an RFID marker housing including at least two bordering material layers surrounding at least part of RFID electronics housed within the RFID marker housing, wherein there is a change in properties between adjacent layers so that shock waves are deflected around the RFID electronics.

In another form the invention resides in an RFID marker housing including at least two bordering material layers surrounding at least part of RFID electronics housed within the RFID marker housing, wherein there is an impedance mismatch between any adjacent two of the at least two material layers.

Suitably the RFID marker housing has a casing of impact resistant plastics material.

Preferably, the casing is of modified polyphenylene ether resin. In particular the casing may be of modified polyphenylene oxide and polyphenylene ether resin. More specifically, the casing may be a blend of polyphenylene oxide and polystyrene.

In another form, the invention resides in a RFID marker housing including:
  a casing; and
  a core within which at least part of RFID electronics is housed, the core being suspended within the casing.

Preferably the at least part of RFID electronics comprises a printed circuit board including electronic components.

Preferably, the core includes a resiliently deformable tube forming the outside of the core and the printed circuit board is housed within a bore of the tube.

Preferably, the space between the casing and the tube is filled with a first strengthening material having material properties which provide an impedance mismatch at the interface between the first strengthening material and one or both of the casing and the tube.

By impedance mismatch is meant a discontinuity in the mechanical and/or acoustic properties of adjacent materials to encourage a shock wave to pass around the interface instead of through it, and to inhibit cracks from propagating across the interface.

Preferably, the first strengthening material is a composite. More specifically the composite is a fibre-reinforced plastic and particularly a polymer matrix reinforced with fibreglass.

Preferably, the core includes a second strengthening material which is located within the bore of the tube and abuts the inside of the tube.

Preferably, the second strengthening material is a composite. More specifically the composite is a fibre-reinforced plastic and particularly a polymer matrix reinforced with fibreglass.

Preferably, the core further includes a shock absorbing material attached to the printed circuit board.

The shock absorbing material may be foam material.

Preferably the tube is of plastics material. In particular the tube may be of polyvinyl chloride material.

Preferably, the casing is the same as the casing defined and described in respect of the first form of the invention.

The invention extends to a RFID marker comprising the RFID marker housing and RFID electronics housed therein.

In yet another form, the invention resides in a RFID marker housing including at least two bordering material layers surrounding at least part of RFID electronics housed within the marker housing and wherein there is an impedance mismatch between the two material layers.

The RFID marker may include one or more barb formations releasably attachable to the marker housing.

BRIEF DESCRIPTION OF THE DRAWINGS

By way of example only, preferred embodiments of the invention will be described more fully hereinafter with reference to the accompanying figures, wherein.

DETAILED DESCRIPTION OF THE DRAWINGS

Figure 1:
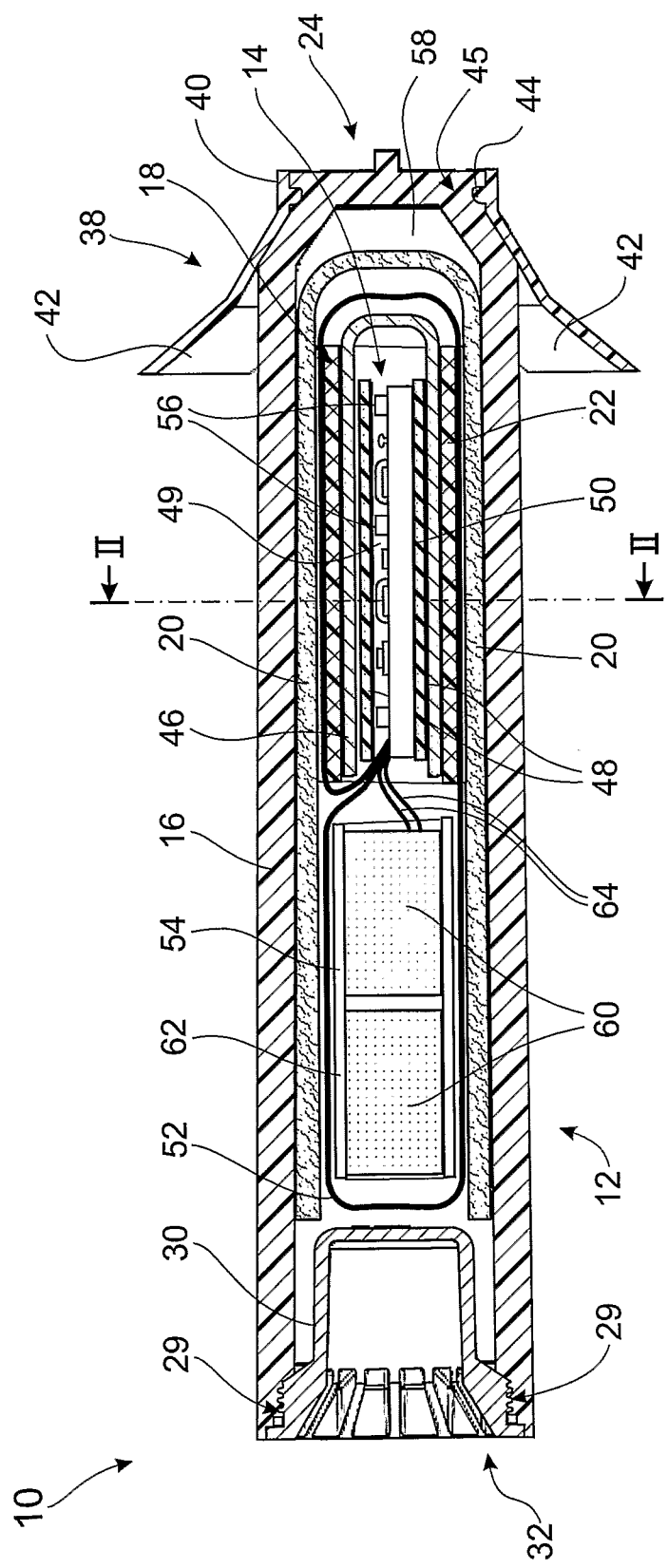
FIG. 1 is a longitudinal sectional side view of a RFID marker housing in accordance with one embodiment of the invention showing RFID electronics housed within the RFID marker housing.

The present invention relates to a RFID marker housing and to RFID markers comprising the RFID marker housing and RFID electronics housed therein. Elements of the invention are illustrated in concise outline form in the drawings, showing only those specific details that are necessary to understand the embodiments of the present invention, but so as not to clutter the disclosure with excessive detail that will be obvious to those of ordinary skill in the art in light of the present description.

In this patent specification, words such as "comprises" or "includes" are not used to define an exclusive set of elements or method steps. Rather, such words merely define a minimum set of elements or method steps included in a particular embodiment of the present invention.

Figure 2:
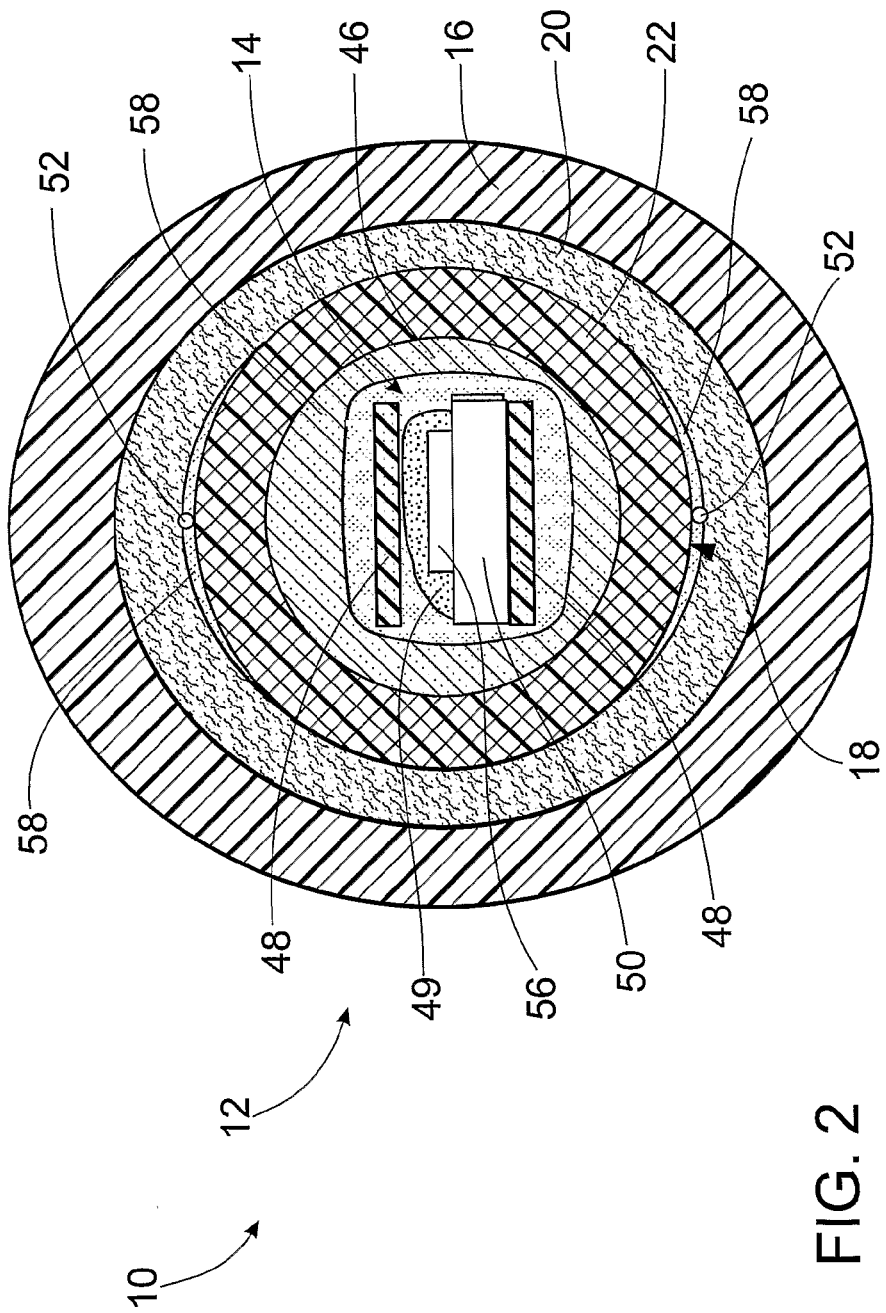
FIG. 2 is a cross-sectional view of the RFID marker housing section along section line II-II of FIG. 1.

Referring to the FIGS. 1 and 2 of the drawings, one embodiment of a RFID marker 10 comprises a RFID marking housing 12 and RFID electronics 14.

The RFID electronics 14 comprises a printed circuit board (PCB) 50, an antenna 52 and a battery pack 54.

The housing 12 comprises a casing 16, a core 18, and first strengthening material in the form of a first composite layer 20 located between the casing 16 and the core 18. The core 18 includes a tube 22, being the outside layer of the core 18.

The casing 16 is closed at a nose end 24 and open at rear end 32. The housing 12 includes a screw-in plug 30 which closes off the rear end 32 of the casing 16. The plug 30 screw-threadingly engages an internal screw thread 29 at the rear end 32 of the casing 16, thereby to selectively allow access to the inside of the casing 16. The plug 30 is described in more detail with reference to FIG. 3 of the drawings. The casing 16 is packed with the components, materials and layers of the housing 12 as described herein-below. The casing 16 is approximately 300 mm in length and 65 mm in outer diameter with an 8 mm wall thickness. The casing 16 is of Noryl® plastics material, which is a blend of polyphenylene oxide and polystyrene. Noryl® plastics material has a high impact and wear resistance, making it particularly suitable for the cave mining environment. The casing 16 is manufactured by injection moulding.

The marker 10 further includes a barb formation 38 which clips onto the nose end 24 of the casing 16. The barb formation 38 comprises a collar 40 with a number of barbs 42 projecting radially from the collar 40. The collar 40 has an inwardly projecting annular bead 44 which clips into a complementary annular groove 45 formed in the casing 16 at its nose end 24. The barb formation 38 aids in locating and holding the markers 10 in holes in the ore body in which the markers 10 are set. The barb formation 38 is particularly useful for setting the markers 10 in substantially vertical holes. The applicant envisages that the barb formation 38 will be available in a variety of sizes to fit different diameter hole sizes. The interchange ability of the barb formations 38 allow the housing 12 to be used in a variety of hole sizes. The applicant further envisages that the marker 10 may include an additional barb formation 38 which clips to the casing 16 at the rear end 32 of the casing 16 (not shown).

The composite layer 20 is located between the casing 16 and the tube 22 of the core 18. The composite layer 20 is of fibreglass mat material and epoxy. The composite layer 20 may be a blanket of fibreglass wrapped around the tube 22 or preferably, as shown in this embodiment, a fibreglass sock set in epoxy. The antenna 52 and battery pack 54 are also enveloped by the fibreglass sock of the composite layer 20.

The tube 22 is of resiliently deformable PVC material. The tube 22 has a 3 mm wall thickness. Due to the different material properties of the casing 16, composite layer 20 and the tube 22, there is effectively an impedance mismatch at the interface between these layers. As such, there is an impedance mismatch between the casing 16 and the composite layer 20. Similarly, there is an impedance mismatch between the composite layer 20 and the tube 22.

The core 18 further includes a second strengthening material in the form of second composite layer 46. The composite layer 46 is formed within the tube 22 and abuts the inside of the tube 22. The second composite layer 46 also comprises a fibreglass mat sock and epoxy within which the sock is set. Due to the different material properties of the tube 22 and the composite layer 46, there is an impedance mismatch at the interface between these two layers.

The PCB 50 is housed within the core 18. The PCB 50 includes components 56, such as crystals, ceramic filters, electronic chips and the like, on one side of the PCB 50.

Mechanically sensitive parts of the electronic components on the PCB 50 are overlaid (or potted) with deformable mass 49 such as gum or reusable adhesive such as Bostik Blu Tack®.

The core 18 further includes two self adhesive foam pads 48 which are applied to PCB 50 on top of the components 56 to the bottom of the PCB 50, respectively. The PCB 50, including the foam pads 48 adhered thereto, is wrapped in the second composite layer 46.

The antenna 52 is in the form of a loop which extends from the PCB 50, and loops around the battery pack 54 and the core 18 back to the PCB 50.

The battery pack 54 comprises one or two batteries 60 and a PVC sleeve 62. Each battery 60 is connected to the PCB 50 by wires 64. The batteries 60 are captively held in the PVC sleeve 62. The battery pack 54 is located adjacent the core 18 in the fibreglass sock of the composite layer 20.

The volume encapsulated by the casing 16 is filled with a fire-retardant epoxy 58. The epoxy 58 acts as a filler which fills all of the space not occupied by the material layers and components of the housing 12 described above. The epoxy 58 acts as a resin for the composite layers 20, 48. The epoxy 58 fills any space between the foam layers 48 and the components 56 of the PCB 50. The epoxy 58 comprises Araldite® CW2245CI resin with REN® HY 956 hardener. The epoxy 58 constrains deflection of the housing and specifically the casing 16 when the marker 10 is subject to bending and sheer forces.

Referring to the description of the housing 12 above, a number of interfaces are provided between impedance mismatched layers. Specifically there is a first strengthening at the interface between the casing 16 and the first composite layer 20, a second strengthening at the interface between the first composite layer 20 and the tube 22, a third impedance mismatch at the interface between the tube 22 and the second composite layer 46, and a fourth impedance mismatch at the interface between the second composite layer 46 and the foam pads 48. The different impedance mismatches all assist in deflecting mechanical shock waves around critical components. The impedance mismatches promote shock waves to propagate around the layers 20, 46, and tube 22 instead of through them. The different impedance mismatches also inhibit crack propagation across the interfaces described above.

Figure 3:
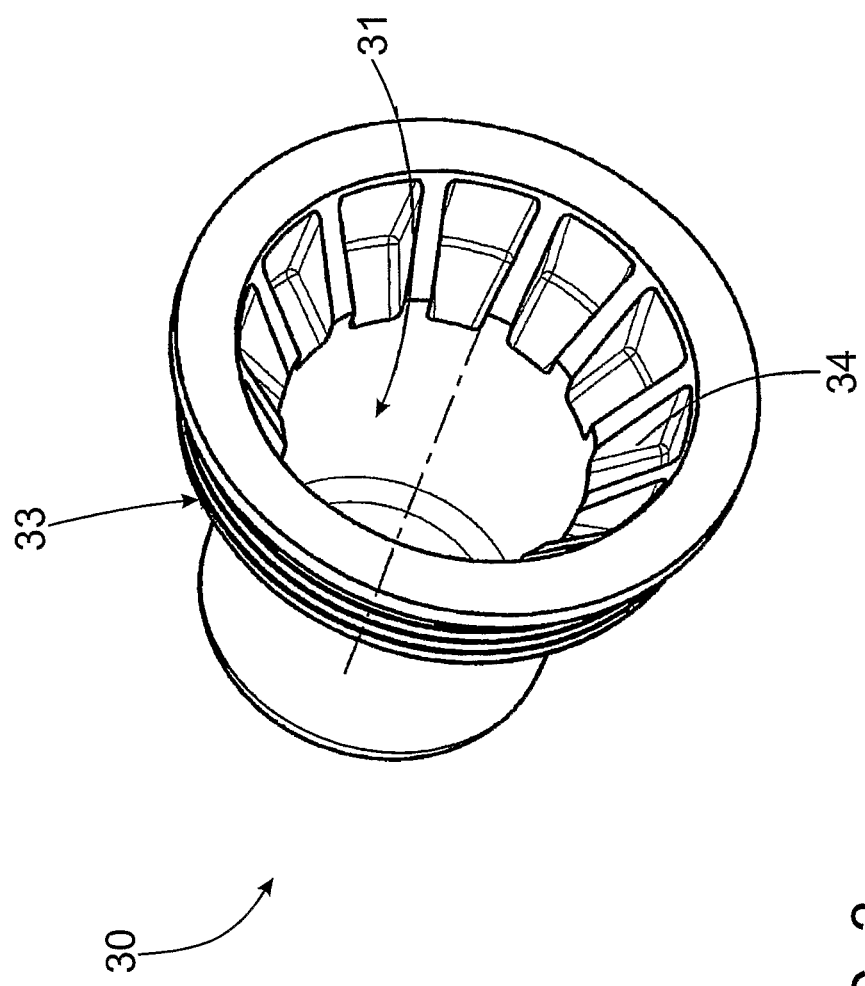
FIG. 3 is a perspective view of the plug of the casing of the RFID marker housing of FIG. 1.

Referring to FIG. 3, the plug 30 has a cavity 31 in which the end of an insertion hose can seat when setting the marker 10 in a hole. The insertion hose is guided into the cavity 31 by a funnel-shaped mouth 34 of the plug 30. The plug 30 is also of Noryl® plastics material. The plug 30 has an external screw-thread 33 which engages the screw thread 29 of the casing 16 to releasably fix the plug 30 to the casing 16.

The marker 10 is assembled in the sequence below:

The antenna 52 is soldered to the PCB 50.

Mechanically sensitive parts of the electronic components on the PCB 50 are overlaid with the deformable mass 49.

Plugs at the end of the wires 64 are plugged into corresponding sockets of the PCB 50.

The foam pads 48 are adhered to each side of the PCB 50.

The PCB 50, including the foam pads 48 adhered thereto, is inserted into the fibreglass sock of the second composite layer 46.

The fibreglass sock of the second composite layer 46, including the PCB 50, is inserted into the tube 22, thereby forming the core 18 (excluding epoxy) and the PCB 50 housed therein.

The assembled core 18, PCB 50, antenna 52 and battery pack 54 are inserted into the fibreglass sock of the first composite layer 20.

All of the previously assembled layers and components is inserted into the casing 16 from the rear end 32.

The casing 16 is filled with epoxy 58 from the rear end 32. The epoxy 58 may be heated to lower its viscosity, thereby to allow it to flow into all the open spaces in the casing 16, including the space between the foam layers 48 and the components 56. The epoxy may alternatively be filled from the nose end 24 using a tube which is extracted after filling.

The casing 16 is vibrated (or a vacuum applied) to cause bubbles in the epoxy 58 to rise and escape from the epoxy 58.

The casing is closed off by the plug 30.

The epoxy 58 is allowed to set.

The marker 10 provides mechanical protection to the electronics 14 housed therein. In sub-level caving damage to the marker 10 may arise from: shock forces generated when the ore body surrounding the marker 10 is blasted; crushing (compression), grinding (communication), sheer and impact forces as the ore is excavated and flows through the haulage network; chemical damage due to acids and alkalis in the ore body; and water damage due to water in the mine environment. Block caving is generally the same as the above with the exception that blasting is not generally the primary method of rock fragmentation so that the markers 10 are not subjected to shock forces generated by blasts. The marker housing 12 provides protection to the electronics 14 against these forces. The housing 12 is particularly rugged due to its configuration and choice of materials as described above.

The above description of various embodiments of the present invention is provided for purposes of description to one of ordinary skill in the related art. It is not intended to be exhaustive or to limit the invention to a single disclosed embodiment. As mentioned above, numerous alternatives and variations to the present invention will be apparent to those skilled in the art of the above teaching. For example, the applicant envisages that the plug 30 may have a solid nose section and a nose guiding section which is frangible from the nose section. The solid nose section may be screwed into the rear end 32 of the casing 16 and the nose guiding section may extend outwardly from the casing 16. The nose guiding includes the cavity 31 and mouth opening 34. The hose guiding section may be broken off from the solid nose section due to impact, without affecting the integrity of the marker 10. Accordingly, while some alternative embodiments have been discussed specifically, other embodiments will be apparent or relatively easily developed by those of ordinary skill in the art. Accordingly, this invention is intended to embrace all alternatives, modifications and variations of the present invention that have been discussed herein, and other embodiments that fall within the spirit and scope of the above described invention.

The invention claimed is:

1. An RFID marker housing including:
    a first material layer surrounding at least part of RFID electronics housed within the RFID marker housing; and
    a second material layer surrounding the first material layer;
    wherein an interface between the first material layer and the second material layer surrounds at least part of the RFID electronics; and
    wherein there is a change in properties at the interface between adjacent material layers so that shock waves are deflected around the RFID electronics.

2. The RFID marker housing of claim 1 comprising a casing of impact resistant plastic material.

3. The RFID marker housing of claim 2 comprising a resiliently deformable tube located within the casing, the resiliently deformable tube surrounding the RFID electronics.

4. The RFID marker housing of claim 1 wherein at least part of the RFID electronics comprises a printed circuit board including electronic components.

5. The RFID marker of claim 1 including one or more barb formations releasably attachable to the marker housing.

6. An RFID marker housing including:
    a casing;
    a core suspended within the casing within which at least part of RFID electronics is housed; and
    material surrounding the core and filling the casing;
    wherein there is a change in properties between adjacent layers so that shock waves are deflected at the boundary between the material and the casing.

7. The RFID marker housing of claim 6 wherein the core includes a resiliently deformable tube forming the outside of the core and a circuit board of the RFID electronics is housed within a bore of the tube.

8. The RFID marker housing of claim 7 wherein the space between the casing and the tube is filled with a first strengthening material having material properties which provide an impedance mismatch at the interface between the first strengthening material and one or both of the casing and the tube.

9. The RFID marker housing of claim 8 wherein the first strengthening material is a composite.

10. The RFID marker housing of claim 8 wherein the first strengthening material is a fibre-reinforced plastic.

11. The RFID marker housing of claim 8 wherein the first strengthening material is a polymer matrix reinforced with fibreglass.

12. The RFID marker housing of claim 6 wherein the core includes a second strengthening material which is located within a bore of a tube and abuts the inside of the tube.

13. The RFID marker housing of claim 12 wherein the second strengthening material is a composite.

14. The RFID marker housing of claim 12 wherein the second strengthening material is a fibre-reinforced plastic.

15. The RFID marker housing of claim 12 wherein the second strengthening material is a polymer matrix reinforced with fibreglass.

16. The RFID marker housing of claim 6 wherein the core further includes a shock absorbing material around to the printed circuit board.

17. The RFID marker housing of claim 16 wherein the shock absorbing material is a foam material.

18. The RFID marker housing of claim 7 wherein the tube is of plastics material.

19. The RFID marker housing of claim 7 wherein the tube is of polyvinyl chloride material.

20. An RFID marker housing including:
  a first material layer surrounding at least part of RFID electronics housed within the RFID marker housing; and
  a second material layer surrounding the first material layer;
  wherein interface between the first material layer and the second material layer surrounds at least part of the RFID electronics; and
  wherein there is a mechanic impedance mismatch at the interface between adjacent material layers so that shock waves are deflected around the RFID electronics.

21. An RFID marker comprising RFID electronics mounted in a RFID housing, the RFID housing including:
  a casing;
  a core suspended within the casing within which at least part of the RFID electronics is housed; and
  material surrounding the core and filling the casing;
  wherein an interface between the material and the casing surrounds at least part of the RFID electronics; and
  wherein there is a mechanical impedance mismatch at the interface between the material and the casing so that shock waves are deflected around the RFID electronics.

* * * * *